(12) United States Patent
Andersson (10) Patent No.: US 6,343,122 B1
(45) Date of Patent: Jan. 29, 2002

(54) METHOD AND APPARATUS FOR ROUTING TRAFFIC IN A CIRCUIT-SWITCHED NETWORK

(75) Inventor: Hans Andersson, Solna (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 08/981,019
(22) PCT Filed: Jun. 28, 1996
(86) PCT No.: PCT/SE96/00862
   § 371 Date: Mar. 26, 1998
   § 102(e) Date: Mar. 26, 1998
(87) PCT Pub. No.: WO97/02711
   PCT Pub. Date: Jan. 23, 1997

(30) Foreign Application Priority Data

Jul. 4, 1995 (SE) ............................................... 9502429

(51) Int. Cl.[7] ........................... H04M 7/00; H04M 15/00
(52) U.S. Cl. .................. 379/219; 379/112.01; 379/133; 379/221.01
(58) Field of Search ....................... 379/221.01–221.15, 379/219, 220.01, 224, 229, 111, 112.01–112.1, 133, 134

(56) References Cited

U.S. PATENT DOCUMENTS

| 4,284,852 A | * | 8/1981  | Szybicki et al. ............ 379/221 |
| 4,669,113 A | * | 5/1987  | Ash et al. ................... 379/221 |
| 4,704,724 A | * | 11/1987 | Krishnan et al. ............ 379/221 |
| 4,788,721 A | * | 11/1988 | Krishnan et al. ............ 379/221 |
| 4,845,744 A | * | 7/1989  | DeBenedictis .............. 379/221 |
| 4,862,496 A | * | 8/1989  | Kelly et al. ................. 379/221 |
| 4,979,118 A | * | 12/1990 | Kheradpir ................... 379/220 |
| 4,991,204 A | * | 2/1991  | Yamamoto et al. ......... 379/221 |
| 5,014,262 A | * | 5/1991  | Harshavardhana .......... 379/220 |
| 5,058,105 A | * | 10/1991 | Mansour et al. ............ 379/221 |
| 5,067,148 A | * | 11/1991 | Sardana ...................... 379/111 |
| 5,101,451 A | * | 3/1992  | Ash et al. ................... 379/221 |
| 5,142,570 A | * | 8/1992  | Chaudhary et al. ......... 379/221 |
| 5,253,248 A | * | 10/1993 | Dravida et al. ............... 370/16 |
| 5,485,147 A | * | 1/1996  | Jaffe et al. ............... 340/825.5 |
| 5,526,414 A | * | 6/1996  | Bedard et al. .............. 379/221 |
| 5,537,468 A | * | 7/1996  | Hartmann ................... 379/221 |
| 5,583,928 A | * | 12/1996 | Tester et al. ................ 379/220 |

FOREIGN PATENT DOCUMENTS

WO            9702711            1/1997

* cited by examiner

*Primary Examiner*—Ahmad Matar
*Assistant Examiner*—Benny Q. Tieu (57) ABSTRACT

A method and an apparatus for routing traffic in a circuit-switched network, comprising offering a call between between an origin node and a destination node to a preferred route between said nodes, and if said preferred route is not available, offering an alternative route via an intermediate node, and for links between two nodes, setting a first trunk reservation threshold for reserving a certain number of circuits for direct calls along said links between said two nodes, and setting a second trunk reservation threshold for calls between nodes connecting a second link of said alternative route.

30 Claims, 4 Drawing Sheets

| Method | N=12, A=106.0, $Q_S$=0.10% | | | | N=12, A=108.6, $Q_S$=1.00% | | | |
|---|---|---|---|---|---|---|---|---|
| | E(L) | $e_{1c}$ | $e_{nc}$ | $P_e$ | E(L) | $e_{1c}$ | $e_{nc}$ | $P_e$ |
| No overflow | 134.6 | 0.999 | 1.998 | 1 | 125.9 | 0.990 | 1.980 | 1 |
| DAR | 123.8 | 1.015 | 2.014 | 1.014 | 121.5 | 1.014 | 2.004 | 1.023 |
| UDR | 121.5 | 1.023 | 2.022 | 1.020 | 120.6 | 1.028 | 2.018 | 1.033 |
| UDR-CT | 120.7 | 1.028 | 2.027 | 1.024 | 120.4 | 1.028 | 2.018 | 1.032 |
| CLLPR | 120.0 | 1.032 | 2.031 | 1.027 | 120.4 | 1.028 | 2.018 | 1.029 |
| ALBA(2) | 120.0 | 1.035 | 2.034 | 1.029 | 119.9 | 1.029 | 2.019 | 1.032 |
| LLPR | 119.6 | 1.034 | 2.033 | 1.028 | 119.7 | 1.028 | 2.018 | 1.031 |

FIG.6

METHOD AND APPARATUS FOR ROUTING TRAFFIC IN A CIRCUIT-SWITCHED NETWORK

This application is the national phase under 35 U.S.C. §371 of prior PCT International Application No., PCT/SE96/00862 which has an International filing date of Jun. 28, 1996 which designated the United States of America, the entire contents of which are hereby incorporated by reference.

The present invention relates to telecommunications networks and methods. In particular it relates to routing of traffic in a circuit-switched network with full or multiple interconnection.

DESCRIPTION OF RELATED ART

In a telecommunications netword traffic is normally routed from an origin to a destination along a pre-assigned direct route. With state of the art switching technologies it is possible to divert overflow traffic on overloaded direct routes along alternative paths and computer controlled exchanges, and common channel signalling allows for an increased flexibility in the implementation of routing methods.

In a fully interconnected network each node is connected to every other node by a link comprising a number of two-way circuits. Alternatively, each node pair must be connected via one or several intermediate nodes. Alternative routes are, however, in practice usually confined to two-link paths between an origin node and a destination node. Calls between a pair of nodes are first routed via the direct link between the nodes. If the direct link is blocked, the overflowing call is routed on an alternative two-link path. In order to prevent overflowing calls on an alternate two-link path from blocking subsequent direct calls on these links, circuit reservation is applied by setting a trunk reservation threshold for each link. Traffic routed on a direct link can use any idle circuit, whereas overflowing calls are accepted on a link only when the number of idle circuits exceeds the trunk reservation threshold.

The development of routing has gone from hierarchical routing methods with fixed alternative paths between nodes arranged in a pre-defined hierarchy to dynamic non-hierarchical routing methods, wherein alternative routes are chosen in a more flexible fashion. Dynamic methods has proved to be important tools to adapt networks to changing traffic demands, shifts in traffic patterns and network failures, as well as to even out excessive idle capacity in some parts of the network and overload in other parts.

Dynamic routing methods are basically divided into time dependent methods and state dependent methods. Time dependent methods are focused on systematic variations in the traffic load of a network, and paths between nodes are redefined at fixed times. This method is directed to the handling of forecasted traffic fluctuations, but gives a poor protection against unplanned traffic variations. State dependent methods use information about the current state of a network to decide an alternative path and adapt well to unplanned traffic changes. It is also known to use a combination of time dependent and state dependent methods.

State dependent methods are divided into centralized, distributed and isolated methods, depending on how the information about the current state of a network is handled. In networks employing centralized methods a central network processor has information about the states of all links of a network, and when an alternative path is needed the least loaded path is recommended. In networks adapted to distributed methods an node has information about the state of its own links and is also able to obtain information about specific links from other nodes. In networks using isolated methods the nodes have information only about their own links.

A centralized dynamic routing method, which in this description is called centralized least loaded path routing or CLLPR is disclosed in the document Regnier J., Cameron W. H., *State-Dependent Dynamic Traffic Management for Telephone Networks*, IEEE Communications Magazine, September 1987. The CLLPR method makes alternative routing decisions and repeatedly determines a recommended alternative path with a preset time interval, with the aid of an extensive knowledge about all the alternative two-link paths. Trunk reservation is applied for all links of the paths in the alternative routing domain.

In the document Mitra D., Gibbens R. J., Huang B. D., *State-Dependent Routing on Symmetric Loss Networks with Trunk Reservations-I*, IEEE Transactions on communications, Vol. 41 No. 2 February 1993, is disclosed a distributed version of least loaded path routing or LLPR. The LLPR method makes the alternative routing decisions on a call-by-call basis with the aid of an extensive knowledge about the states of the alternative two-link paths.

A distributed routing method called aggregated least busy alternative routing or ALBA(2) is also disclosed in Mitra D., Gibbens R. J., Huang B. D., *State-Dependent Routing on Symmetric Loss Networks with Trunk Reservations-I*, IEEE Transactions on communications, Vol. 41 No. 2February 1993. In ALBA(2) the alternative routing decisions are made on a call-by-call basis with only a limited knowledge about the states of the alternative two-link paths. Also in this method, trunk reservation is applied for all links of the paths in the alternative routing domain.

The document EP-A1-0 229 494 discloses an isolated dynamical alternate routing method called DAR, in which a call between two nodes interconnected by a direct link is first offered to the direct route. If the direct route is blocked, the call is offered to at currently nominated two-link alternative route between the two nodes. If that route is busy, the call is lost and a randomly chosen two-link route is assigned to be the new current alternative route. Trunk reservation is applied on alternative routes. This kind of routing method is also referred to as dynamic alternative routing or DAR.

In comparison with isolated methods, centralized and distributed methods give a more efficient utilization of network resources, i.e. there are less blocked or lost calls for a given total number of connecting circuits. However, the centralized and distributed methods have the drawbacks that they entail a heavier capacity load in the nodes, complicated routing principles and great demand for information exchange between involved nodes and possible calculation centers.

Therefore, isolated methods are attractive but suffer from the drawback of relatively low network efficiency.

SUMMARY OF THE INVENTION

The problem to be solved by the present invention, and thus the object of it is to achieve an isolated alternative routing method with improved network efficiency, i.e. reduced number of lost calls in a network with a given number of connecting links.

According to a first aspect of the present invention the problem is solved by setting the trunk reservation threshold for each link in an alternative route depending on the position of the link. In e.g. a two-link path, the trunk reservation threshold on the first link would be set to a normal value reserving an appropriate number of circuits for direct calls, whereas the trunk reservation threshold for the second link would be set lower and preferably to zero for the second link. In this sense the inventive method may be called unsymmetrical as it applies trunk reservation in an unsymmetrical fashion. Consequently, if an overflowing call has been accepted to use a first link or an attempted alternative route, it is allowed to use a second link as long as there is any idle circuit in said second link. In this way the utilization of network resources is increased, since an overflow call which already has occupied a first link will be accepted in more instances than with prior art.

According to a second aspect of the present invention an alternative path, of which a first link has not reached its blocking threshold, is repeatedly searched for a predefined number of times, according to a presetable sequence of alternative routes. In this text this is called multiple scanning, and in a preferred embodiment of the invention multiple scanning is applied for a first link in, for example, a two-link path and single scanning is applied for a second link of said path.

In accordance with a third aspect, the present invention may comprise adaptive setting of a currently recommended route, which is the first alternative route to be selected when a direct route is not available. In one embodiment this aspect a currently recommended route is set dependent on a currently recommended route change threshold, thus allowing the currently recommended route to be changed before a route is blocked.

The present invention also provides an apparatus for routing traffic in a circuit-switched network of nodes according to the inventive method, each node comprising at least one processor. Each processor is adapted to offer a call between nodes via at least on preferred node and at least on alternative route. For each processor at least one parameter is provided, which is used to set a first and a second trunk reservation threshold.

Advantages of the inventive method is that it requires no new inter-node messages and very little additional processor capacity per call. Another advantage is that the rules for connections over the different links in the considered network are very simple.

BRIEF DESCRIPTION OF THE DRAWINGS

Embodiments of the present invention will be described with reference to the accompanying drawings, in which.

DETAILED DESCRIPTION OF EMBODIMENTS

Figure 1:
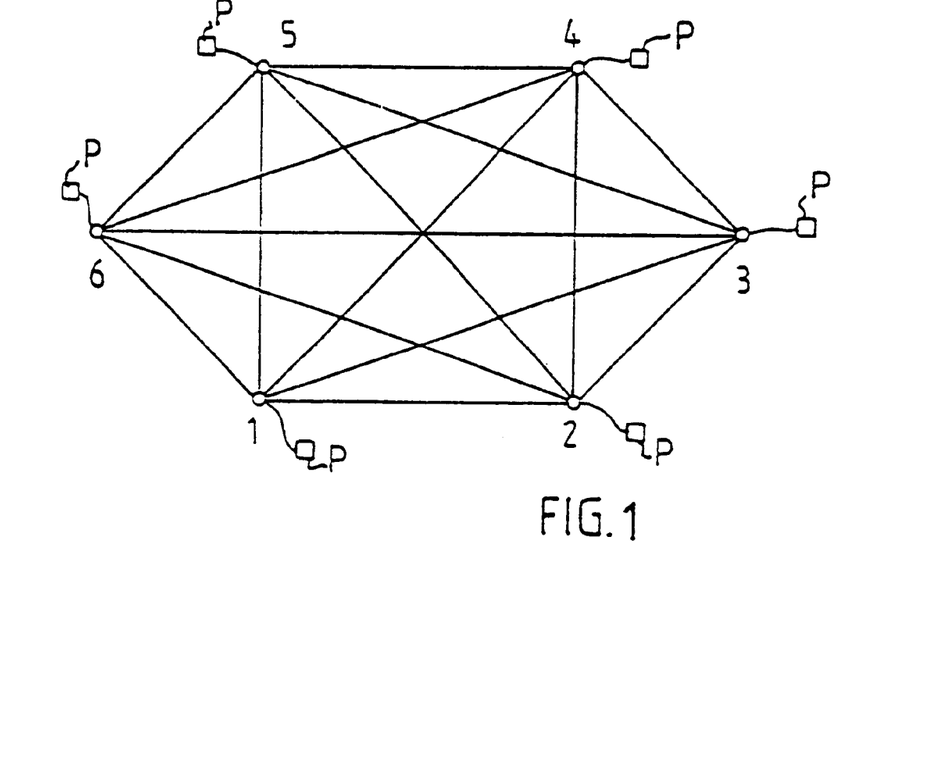
FIG. 1 is a schematic diagram of a non-hierarchical, fully interconnected network with 6 nodes and direct links between each node.

FIG. 1 shows an example of a non-hierarchical, fully interconnected mesh network with 6 nodes, each provided with at least one processor P. Each node is connected to every other node by a direct link comprising a number of two-way circuits. Calls between a pair of nodes are first routed via the direct link between the nodes. If the direct link is blocked, an overflowing call is routed on an alternative two-link path via an intermediate node.

Figure 2:
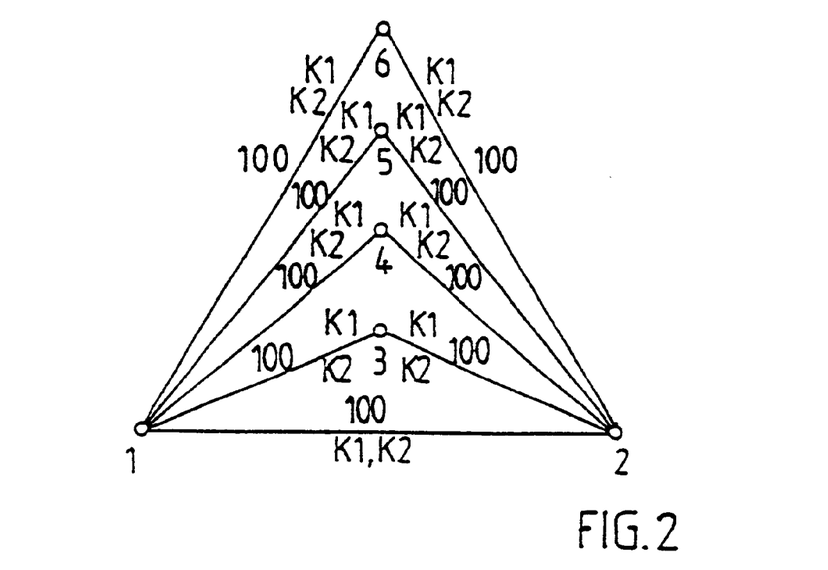
FIG. 2 is a schematic diagram of the direct route and the possible two-link routes between the nodes 1 and 2 of the network according to FIG. 1.

In FIG. 2 is for example shown the direct route and the set of possible two-link routes between the nodes 1 and 2 of the network in FIG. 1. More generally the set of possible two-link paths between a node pair i and j is called the alternative routing domain $D(i,j)$ and is defined as the arbitrarily ordered set of two-link paths (i->k->j:1=<k=<N, with each k different from i and j). In the present example, the network is fully connected and the nodes are numbered from 1 to N, with N equal to the total number of nodes. Thus, the alternative routing domain $D(i,j)$ may be regarded as a permutation $p(1), p(2), \ldots, p(N-2)$ of the numbers $1,2,\ldots,N$ except for the numbers i and j. It is also possible to choose a subset of the possible two-link paths between two nodes as an alternative routing domain. In the example of FIG. 2 $D(i,j)$ for i=1 and j=2 is $D(1,2)=(3,4,5,6)$.

According to an embodiment of the present invention, a currently recommended alternative route or path CRP is adaptively preset as the first alternative route to be selected and tested for an overflowing call. A trunk reservation threshold or a blocking threshold is set by means of a trunk reservation parameter for each link. For example, the number of circuits on each link could be 100 and the trunk reservation parameter could be set to 10. According to the invention, the trunk reservation parameter $K2$ for the second link in a two-link path is set to a lower value than the trunk reservation parameter $K1$ for the first link, and preferably to zero. The trunk reservation threshold for a link is thus dependent on the direction of an alternatively routed call.

In accordance with an embodiment of the inventive method, trunk reservation is thus applied for the first link in an i->l->j connection, whereas a call on the second link is preferably treated as a call without overflow and without trunk reservation. The considered link is a first link if the preceding node in the call attempt is located outside the considered mesh network and a second link if the preceding node belongs to said mesh network. For each originating call, the first choice is the direct link between the origin node and the destination node. If the direct link is blocked, an alternative path of which the first link has not reached its blocking threshold is repeatedly searched, also called multiple scanning or overflow, for a number of up to M times according to a currently recommended routing sequence. The search is started with the currently recommended alternative path CRP and is carried out sequentially or cyclically in the alternative routing domain. If the last alternative path in the alternative routing domain is reached and rejected during a cyclical search, the first alternative path in the alternative routing domain becomes the next to be selected and tested.

In the first links of all M investigated alternate paths have reached their blocking thresholds, the call is blocked and the next alternative path in the alternative routing domain is set to be the currently recommended path CRP for the next overflowing call.

If an alternative path not having reached its blocking threshold on its first link is found within the M allowed trials and if the second is fully occupied, the call is blocked and the next alternate path in the alternative routing domain is set to be the currently recommended path CRP for the next overflowing call.

If an alternative path not having reached its blocking threshold on its first link is found within the M allowed trials and if the second link is not fully occupied, this route is selected, the call is accepted and the selected alternative path is set to be the currently recommended path CRP for the next overflowing call.

An embodiment of the, by means of an example applied for a two-link alternative path, inventive method can be described in a more formal way as follows. With:

D(i,j)—being the above mentioned routing domain (p(1), p(2), ..., p(N−2) and equal to a permutation of the numbers 1,2, ..., N with i and j excluded;

NCRP—being the number of the intermediate node of the currently recommended path CRP (i–>NCRP–>J);

M—being the maximum allowed number of multiple overflows (0<M=<N−2), i.e. multiple overflow occur when an alternatively offered route is blocked to a call and the call overflows to a second offered alternative route;

N—being the total number of nodes in the considered network;

X(r)—being the number of idle trunks or circuits in the first links of a currently recommended routing sequence of M alternative paths i–>p(c+r)–>j, for 1=<r=<M and p(c+1)=NCRP;

Y(r)—being the number of idle trunks or circuits in the second links of a currently recommended routing sequence of M alternative paths i–>p(c+r)–>j, for 1=<r=<M and p(c+1)=NCRP;

K(r)—being the number of reserved trunks or circuits for directly routed calls in the first links of the currently recommended routing sequence of M alternative paths i–>p(c+r)–>j, for 1=<r=<M and p(c+1)=NCRP; and m—denoting the first of the M alternative paths of a currently recommended routing sequence fulfilling the condition X(m)>K(m), i.e. m=min (1=<r=<M: X(r)>K (r), and if there is no such r, 1=<r=<M, fulfilling this requirement, then setting m>M.

With these definitions the following steps are comprised in an embodiment of the inventive method:

1) A call between an origin-destination node pair i and j is first offered to a direct link i–>j. If said direct link i–>j is not fully occupied, the call is accepted on this link and the currently recommended path CRP is kept, otherwise the call is further treated according to step 2, see below.

2) The call is offered to the alternative paths in the routing domain D(i,j) of said node pair according to a currently recommended routing sequence of M alternative paths i–>p(c+r)–>j, for 1=<r=<M and p(c+1)=NCRP.

If m>M, i.e. if X(r)=<K(r) for all alternative paths i–>p (c+r)–>j, for 1=<r=<M and p(c+1)=NCRP, the call is blocked and the next alternative path in the alternative routing domain D(i,j) is set to be the currently recommended path CRP for the next overflowing call from the direct link i–>j. If m=<M, the call is treated according to step 3, see below.

3) If m=min (1=<r=M: X(r)>K(r), m=<M and Y(m)=0, the call is blocked and the alternative path i–>p(c+M+ 1)–>j is set to be the currently recommended path CRP for the next overflowing call from the direct link i–>j.

If m=<M and Y(m)>0, the call is accepted and the alternative path i–>p(c+m)–>j is kept as the currently recommended path CRP for the next overflowing call from the direct link i–>j.

Figure 3:
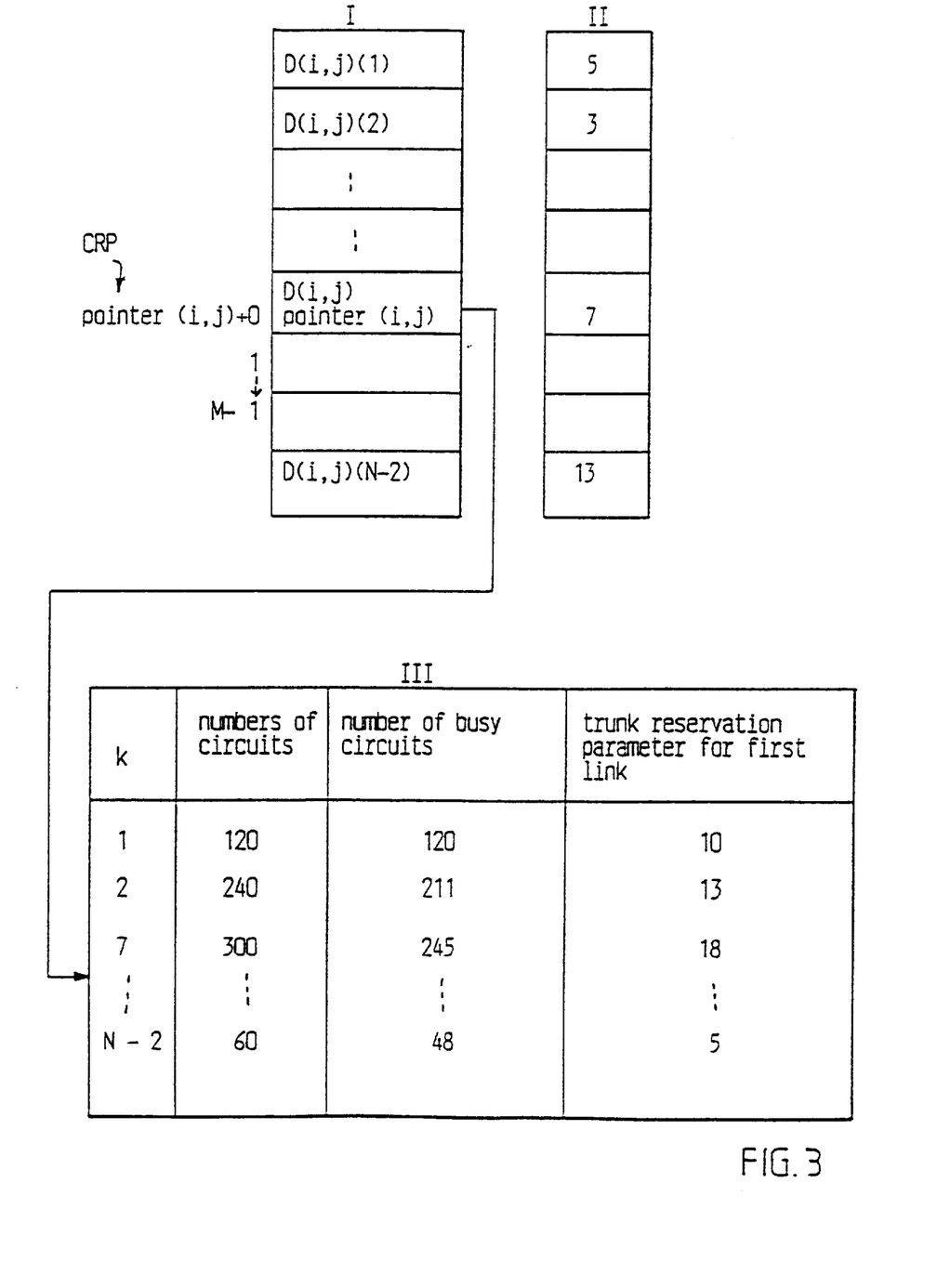
FIG. 3 is a table of alternative routing domains according to FIG. 2.

FIG. 3 shows tables I, II and III illustrating the alternative routing domain and pointers used to set the currently recommended path CRP in another example of a mesh network comprising e.g. 13 nodes, and an implementing principle of an embodiment of the invention. Table I shows the routing domain D(i,j) (r) for 1=<r=<M, M=N−2 ordered in a currently recommended routing sequence, table II shows the corresponding number k of intermediate nodes in said sequence and shows the states for number of circuits, number of busy circuits and trunk reservation parameter of the first links i–>k in the two-link paths of said sequence. In this instance a first pointer is set on CRP=7, and a second pointer is set on the state of first line i=>k, k=7 in the state table III.

In a further embodiment of the invention the trunk reservation parameters for first links are periodically or continuously adapted to the actually observed traffic on the network. The trunk reservation parameters may in this instance be non-negative integer valued stochastic processes with its values determined by the originating nodes based on traffic observations at these nodes.

Overflow calls have a tendency to occur closely in time, that is in a non-stochastic way or according to a non-Poissonian behaviour. For this reason currently recommended alternative paths may be protected from overflowing, e.g. by changing the currently recommended route or path CRP, if an overflowing call from a particular direct link is followed by another overflow call from the same direct link within a specified and presetable time limit.

Test Results

The test results shown that the inventive method have better performance than prior art isolated methods and performance close to much more resource demanding centralized and distributed methods, when the network systems are lightly loaded and have a small number of circuits in the links. As the number of circuits increases towards infinity, all methods asymptotically become equivalent.

Figure 4:
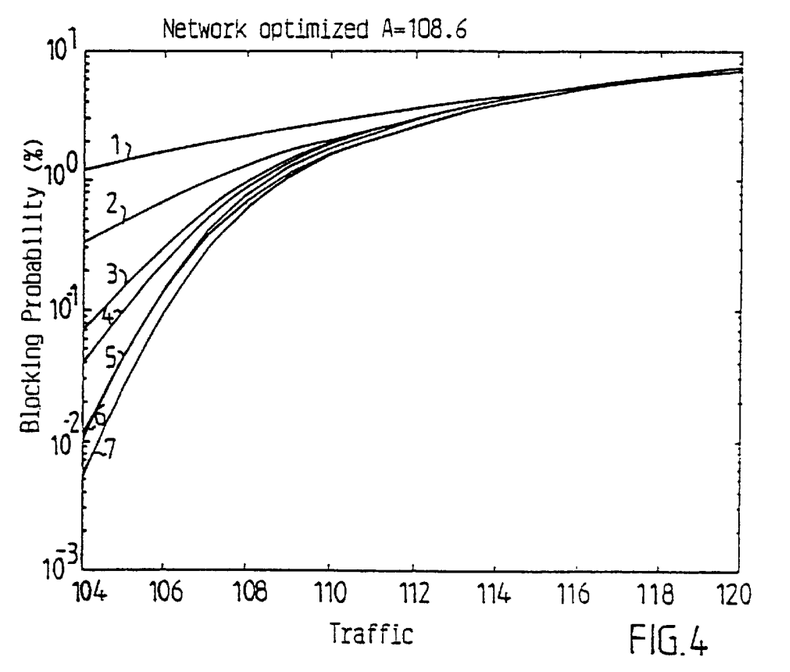
FIGS. 4 and 5 are diagrams.
Figure 5:
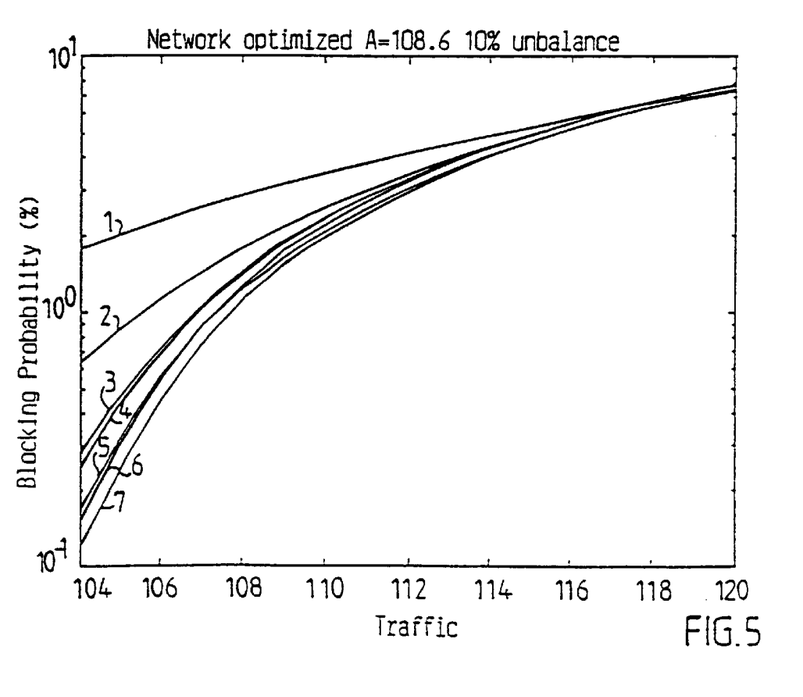
Figure 6:
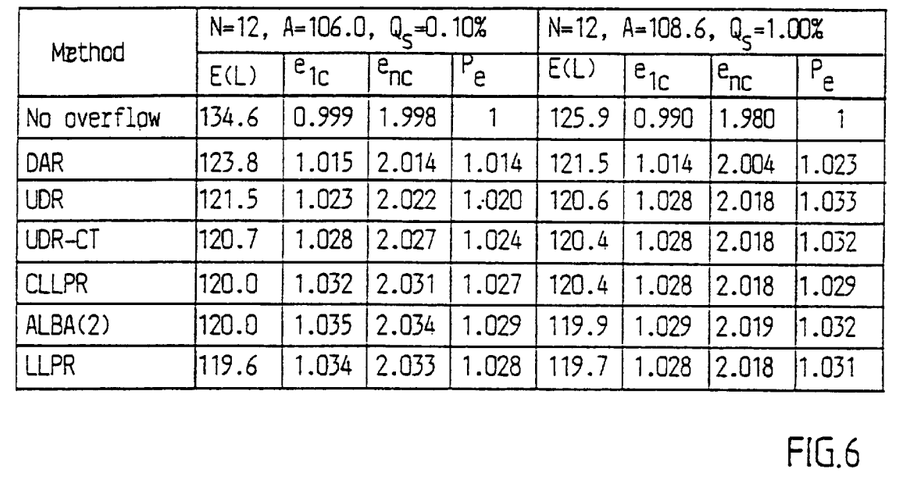
FIG. 6 is a table, wherein the performance of the inventive routing method is compared to prior art routing methods.

In FIGS. 4 and 5 is compared, by means of simulation results, the performance of seven methods, whereof 5 prior art methods and two embodiments of the inventive method, as functions of the link traffic A, when implemented in a fairly small system with 12 nodes and links of equal size with 120 circuits. The compared methods are: 1. Only direct traffic; 2. Dynamical alternative routing—DAR; 3. The inventive method—UDR; 4. The inventive method with adaptive setting of the currently recommended route UDR-CT; 5. ALEA(2); 6. CLLPR; and 7. LLPR. In FIG. 4 all direct traffic is equal to all links and in FIG. 5 there is an unbalanced traffic situation, with the outgoing link traffic equal to /A÷0.1A)/2 for six nodes and equal to (A−0.1A) for the other six nodes.

The situation shown in FIG. 5, where one part of the network is heavily loaded while the other part is lightly loaded, can e.g. Illustrate a network that meets different traffic situations during different times of day. Examples of this case is an interstate network covering different time-zones, or a network serving a city and its suburbs. In the latter example there is heavy traffic in the central part of the city during office hours, and in the evening the traffic load is shifted to the suburbs. A third example is the case with wrongly forecasted traffic patterns in a network.

What is claimed is:

1. A method for routing traffic in a circuit-switched network comprising:

performing at plural nodes of the circuit-switched network the steps of:

offering a call between an originating node and a destination node as a preferred route between said nodes;

if said preferred route is not available, offering a first alternative route via at least one intermediate node, thus creating a first alternative route including at least two links;

setting a first trunk reservation threshold for reserving a certain number of circuits for direct calls along a first link between the originating node and the at least one intermediate node; and setting a second trunk reservation threshold for a second link between the at least one intermediate node and a next node in the first alternative route;

said second trunk reservation threshold being set lower than the first trunk reservation threshold.

2. A method as recited in claim 1, wherein said second trunk reservation threshold is set to zero for making said second link available in the presence of any idle circuit in said second link.

3. A method as recited in claim 1, said method further comprising:

selecting and investigating a second alternative route when a number of idle circuits on the first link of the first offered alternative route is less than said first trunk reservation threshold, where a call is lost if said second alternative route is not available.

4. A method as recited in claim 1, further comprising:

selecting and investigating a presetable number of second alternative routes, where a call is lost if none of said second alternative routes is available.

5. A method as recited in claim 1, further comprising:

selecting a presetable currently recommended route as the first offered alternative route, and selecting and investigating a presetable number of alternative routes in sequence until either an available route is found or the call is lost if said currently recommended route is not available.

6. A method as recited in claim 5, further comprising:

setting the currently recommended route to the next alternative route in said sequence if the number of idle circuits on the first link of the first offered alternative route is less than said first trunk reservation threshold and none of the alternative routes in said sequence is available.

7. A method as recited in claim 5, further comprising:

setting the currently recommended route to a second alternative route next to said first alternative route if the number of idle circuits on the first link of the second offered alternative route in said sequence is larger than said first trunk reservation threshold and there is no idle circuit on the second link.

8. A method as recited in claim 5, further comprising:

setting a currently recommended route change threshold, and changing said currently recommended route based on said currently recommended route change threshold.

9. A method as recited in claim 5 further comprising: changing said currently recommended route if an overflow call from a particular direct link is followed by another overflow call from the same direct link within a specified and presetable time limit.

10. A method as recited in claim 1, wherein said preferred route is a single link route and said alternative route is a two-link route.

11. A method as recited in claim 1, further comprising:

periodically or continuously adapting said first trunk reservation threshold to observed traffic, wherein the trunk reservation threshold may be a non-negative integer-valued stochastic process with values for the process being determined by the originating nodes based on traffic observations at the originating nodes.

12. The method of claim 1 wherein the next node is one of an intermediate node and a destination node.

13. A method for routing traffic in a circuit-switched network comprising:

offering a call between an original node and a destination node as a preferred route between said nodes:

offering a first alternative route via an intermediate node if said preferred route is not available;

setting a first trunk reservation threshold for a first link between the original node and a first node, said first trunk reservation threshold designating a certain number of circuits to be reserved for direct calls along said first link between the original node and the first node, and setting a second trunk reservation threshold for calls between the first node and the second node connecting the second link of said alternative route;

wherein said step of offering a first alternative route includes, selecting a presetable currently recommended route as the first offered alternative route;

said method selecting and investigating a presetable number of alternative routes as said first alternative route in sequence until either an available route is found or the call is lost, if said currently recommended route is not available; said method further comprising;

selecting the alternative route with a lowest number in the sequence of said presettable number of alternative routes for which a number of idle circuits on said first link thereof is larger than the first trunk reservation threshold and for which there is no idle circuit on said second link if none of the alternative routes of said sequence is available, and setting the currently recommended route to said selected alternative route.

14. A method for routing traffic in a circuit-switched network comprising:

offering a call between an original node and a destination node as a preferred route between said nodes;

offering a first alternative route via an intermediate node is said preferred route is not available;

setting a first trunk reservation threshold for a first link between the original node and a first node, said first trunk reservation threshold designating a certain number of circuits to be reserved for direct calls along said first link between the original node and the first node, and setting a second trunk reservation threshold for calls between the first node and the second node connecting the second link of said alternative route;

wherein said step of offering a first alternative route includes, selecting a presetable currently recommended route as the first offered alternative route;

said method selecting and investigating a presetable number of alternative routes as said first alternative route in sequence until either an available route is found or the call is lost, if said currently recommended route is not available; said method further comprising;

selecting the alternative route with a lowest number in the sequence of said presettable number of alternative routes for which a number of side circuits on said first link thereof is larger than the first trunk reservation threshold and for which there is no idle circuit on said second link if none of the alternative routes of said sequence is available, and accepting the call, said step of setting the currently recommended route to said selected alternative route being performed after said step of accepting the call.

15. A method for routing traffic in a circuit-switched network comprising:

offering a call between an original node and a destination node as a preferred route between said nodes;

offering an first alternative route via an intermediate node if said preferred route is not available;

setting a first trunk reservation threshold for a first link between the original node and a first node, said first trunk reservation threshold designating a certain number of circuits to be reserved for direct calls along said first link between the original node and the first node, and setting a second trunk reservation threshold for calls between the first node and the second node connecting the second link of said alternative route;

wherein said step of offering a first alternative route includes, selecting a presetable currently recommended route as the first offered alternative route;

said method selecting and investigating a presetable number of alternative routes as said first alternative route in sequence until either an available route is found or the call is lost, if said currently recommended route is not available; said method further comprising;

changing said currently recommended route based on said currently recommended route change threshold, and setting a currently recommended route change threshold for said second link of the first alternative route, and selecting a new currently recommended route for the traffic from said originating node to said destination node if an overflowing call is accepted on said selected first alternative route and if the number of idle circuits on said second link is less or equal to the sum of the trunk reservation threshold.

16. An apparatus of routing traffic through a circuit-switched network, comprising:

at least one processor at each node of the network, plural of said processors at plural nodes being structured and arranged including:

means for offering a preferred route for calls between an origin node and a destination node, means for offering an alternative route between the origin and destination nodes via at least one intermediate node, if said preferred route is not available, means for setting a first trunk reservation threshold parameter for reserving a certain number of direct calls along a link between said originating node and the at least one intermediate node, and means for setting a second trunk reservation threshold parameter for calls between said at least one intermediate node and a next node in said alternative route.

17. An apparatus as recited in claim 16, wherein the link between the originating node and said at least one intermediate node is a first link and the link between the at least one intermediate node and a next node is a second link;

wherein the means for setting the second trunk reservation threshold parameter set said second trunk reservation threshold to zero for making said second link available in the presence of any idle circuit in said second link.

18. An apparatus as recited in claim 16, further comprising:

means for selecting and investigating a second alternative route, where the call is lost if said second alternative route is not available.

19. An apparatus as recited in claim 16, further comprising:

means for selecting and investigating a presetable number of second alternative routes, if none of said second alternative routes is available.

20. An apparatus as recited in claim 16, further comprising:

means for selecting a presetable currently recommended route as a first offered alternative route, and means for selecting and investigating a presetable number of alternative routes in sequence until either an available route is found or the call is lost.

21. An apparatus as recited in claim 20, further comprising:

means for setting the currently recommended route to the next alternative route in said sequence if the number of idle circuits on the first link of an offered alternative route is less than said first trunk reservation threshold and thus none of the alternative routes in said sequence is available.

22. An apparatus as recited in claim 20, wherein the link between the originating node and said at least one intermediate node is a first link and the link between the at least one intermediate node and a next node is a second link; said apparatus further comprising:

means for setting the currently recommended route to the alternative route next to said offered alternative route if the number of idle circuits on the first link of an offered alternative route in said sequence is larger than said first trunk reservation threshold and there is no idle circuit on the second link.

23. An apparatus as recited in claim 20, further comprising:

means for setting a currently recommended route change threshold, and means for changing said currently recommended route based on said currently recommended route change threshold.

24. An apparatus as recited in claim 20, wherein said preferred route is a single link route and said alternative route or routes are two-link routes.

25. An apparatus as recited in claim 20, further comprising:

means for periodically or continuously adapting said first trunk reservation threshold to the actually observed traffic, wherein the trunk reservation threshold may be determined by non-negative integer valued stochastic processes with values for the process being determined by the originating nodes based on traffic observations at the originating nodes.

26. An apparatus as recited in claim 20, further comprising:

means for changing said currently recommended route if an overflow call from a particular direct link is followed by another overflow call from the same direct link within a specified and presetable time limit.

27. The apparatus of claim 16 wherein the next node is one of an intermediate node and a destination node.

28. An apparatus for routing traffic through a circuit-switched network comprising:
at least one processor at each node of the network, said processors being structured and arranged including:
means for offering a preferred route for calls between an origin node and a destination node;
means for offering an alternative route between the origin and destination nodes via an intermediate node if said preferred route is not available;
means for setting a first trunk reservation threshold parameter for reserving a certain number of direct calls along said link between said origin node and a first intermediate node; and
means for setting a second trunk reservation threshold parameter for calls between said first intermediate node and a next node connecting a second link of said alternative route; said means for offering a preferred route including,
means for selecting a presetable currently recommended route as a first offered alternative route;
means for selecting and investigating a presetable number of alternative routes in sequence until either an available route is found or the call is lost;
means for selecting the alternative route with a lowest number of said sequence for which a number of idle circuits on said first link is larger than the trunk reservation threshold for said first link and for which there is at least one idle circuit on said second link if one or more alternative routes of said sequence is available, and
means for setting the currently recommended route to said selected alternative route.

29. An apparatus for routing traffic through a circuit-switched network comprising:
at least one processor at each node of the network, said processors being structured and arranged including:
means for offering a preferred route for calls between an origin node and a destination node;
means for offering an alternative route between the origin and destination nodes via an intermediate node if said preferred route is not available;
means for setting a first trunk reservation threshold parameter for reserving a certain number of direct calls along said link between said origin node and a first intermediate node; and
means for setting a second trunk reservation threshold parameter for calls between said first intermediate node and a next node connecting a second link of said alternative route; said means for offering a preferred route including,
means for selecting a presetable currently recommended route as a first offered alternative route;
means for selecting and investigating a presetable number of alternative routes in sequence until either an available route is found or the call is lost;
means for selecting the alternative route with a lowest number in said sequence for which a number of idle circuits on said first link is larger than the trunk reservation threshold for said first link and for which there is at least one idle circuit on said second link if one or more alternative routes of said sequence is available,
means for accepting the call, and
means for setting the currently recommended route to said selected alternative route.

30. An apparatus for routing traffic through a circuit-switched network, comprising:
at least one processor at each node of the network, said processors being structured and arranged including:
means for offering a preferred route for calls between an origin node and a destination node;
means for offering an alternative route between the origin and destination nodes via an intermediate node if said preferred route is not available;
means for setting a first trunk reservation threshold parameter for reserving a certain number of direct calls along said link between said original and intermediate nodes; and
means for setting a second trunk reservation threshold parameter for calls between said intermediate node and a next node connecting a second link of said alternative route; said means for offering a preferred route including,
means for selecting a presetable currently recommended route as a first offered alternative route;
means for selecting and investigating a presetable number of alternative routes in sequence until either an available route is found or the call is lost;
means for setting a currently recommended route change threshold;
means for changing said currently recommended route based on said currently recommended route change threshold;
means for setting a currently recommended route change threshold for said second link of an alternative route, and
means for selecting a new currently recommended route for the traffic from said originating node to said destination node if an overflowing call is accepted on said alternative route and if the number of idle circuits on said second link is less or equal to the sum of the trunk reservation threshold.

* * * * *